United States Patent
Brandner

(10) Patent No.: US 11,260,357 B2
(45) Date of Patent: Mar. 1, 2022

(54) PROCESS AND APPARATUS FOR FLUIDIZING A CATALYST BED

(71) Applicant: UOP LLC, Des Plaines, IL (US)

(72) Inventor: Kevin J. Brandner, Bartlett, IL (US)

(73) Assignee: UOP LLC, Des Plaines, IL (US)

( * ) Notice: Subject to any disclaimer, the term of this patent is extended or adjusted under 35 U.S.C. 154(b) by 1060 days.

(21) Appl. No.: 15/851,603

(22) Filed: Dec. 21, 2017

(65) Prior Publication Data

US 2019/0193040 A1    Jun. 27, 2019

(51) Int. Cl.
*B01J 8/00* (2006.01)
*B01J 8/18* (2006.01)
*B01J 8/28* (2006.01)
*B01J 8/38* (2006.01)
(Continued)

(52) U.S. Cl.
CPC ........... *B01J 8/1836* (2013.01); *B01J 8/1818* (2013.01); *B01J 8/1863* (2013.01); *B01J 8/28* (2013.01); *B01J 8/388* (2013.01); *B01J 38/32* (2013.01); *C10G 3/00* (2013.01); *C10G 11/182* (2013.01); *C10G 11/185* (2013.01);
(Continued)

(58) Field of Classification Search
CPC ..... B01J 8/00; B01J 8/18; B01J 8/1818; B01J 8/1836; B01J 8/1845; B01J 8/1863; B01J 8/24; B01J 8/26; B01J 8/28; B01J 8/38; B01J 8/384; B01J 8/388; B01J 38/00; B01J 38/04; B01J 38/12; B01J 38/30; B01J 38/32; B01J 2208/00008; B01J 2208/00017; B01J 2208/00106; B01J 2208/00115; B01J 2208/00132; B01J 2208/00796; B01J 2208/00893; B01J 2208/00911; B01J 2208/00938; C10G 3/00; C10G 11/00; C10G 11/14; C10G 11/18; C10G 11/182; C10G 11/185; C10G 11/187; C10G 2300/00; C10G 2300/40; C10G 2300/4006; F28D 7/00; F28D 7/10;
(Continued)

(56) References Cited

U.S. PATENT DOCUMENTS

| 4,960,503 A * | 10/1990 | Haun ............... C10G 11/18 208/113 |
| 5,027,893 A | 7/1991 | Cetinkaya et al. |
| 2015/0360332 A1 | 12/2015 | Singh et al. |

FOREIGN PATENT DOCUMENTS

| CA | 1249583 A1 | 1/1989 |
| CN | 201545836 U | 8/2010 |

(Continued)

OTHER PUBLICATIONS

Samson et.al., Two-phase flow header tests, SAE Technical Papers, 1987, 17th Intersociety Conference on Environmental Systems.

(Continued)

*Primary Examiner* — Natasha E Young
(74) *Attorney, Agent, or Firm* — Paschall & Associates, LLC; James C. Paschall

(57) ABSTRACT

A process and apparatus for fluidizing a catalyst cooler with fluidization gas fed to the cooler below the catalyst bed is disclosed. Fluidization headers extend through an outlet manifold and deliver fluidization gas through distributors protruding through an outlet tube sheet defining said outlet manifold. The outlet manifold collects heated water vapor from the catalyst cooler and discharges it from the catalyst cooler.

20 Claims, 1 Drawing Sheet

(51) Int. Cl.
*C10G 3/00* (2006.01)
*C10G 11/18* (2006.01)
*F28D 7/12* (2006.01)
*B01J 38/32* (2006.01)
*F28D 21/00* (2006.01)

(52) U.S. Cl.
CPC .............. *C10G 11/187* (2013.01); *F28D 7/12* (2013.01); *B01J 2208/00132* (2013.01); *B01J 2208/00938* (2013.01); *C10G 2300/4006* (2013.01); *F28D 2021/0022* (2013.01)

(58) Field of Classification Search
CPC ................... F28D 7/12; F28D 2021/00; F28D 2021/0019; F28D 2021/0022
See application file for complete search history.

(56) References Cited

FOREIGN PATENT DOCUMENTS

| | | |
|---|---|---|
| CN | 103240036 A | 8/2013 |
| CN | 203719473 U | 7/2014 |
| CN | 205537223 U | 8/2016 |
| JP | 2003130579 A | 5/2003 |
| WO | 2001056690 A1 | 8/2001 |
| WO | 2012118710 A2 | 9/2012 |

OTHER PUBLICATIONS

Dario et.al., Review on two-phase flow distribution in parallel channels with macro and micro hydraulic diameters: main results, analyses, trends, Applied Thermal Engineering, v 59, n 1-2, p. 316-35, Sep. 25, 2013.

Webb et.al., Two-phase flow distribution to tubes of parallel flow air-cooled heat exchangers, Heat Transfer Engineering, v 26, n 4, p. 3-18, May 2005.

Strelkova et.al., On the strength of the header systems of high-pressure preheaters [power station steam plants], Elektricheskie Stantsii, n 1, p. 13-17, 1984.

Mahvi et.al., Visualization of flow distribution in rectangular and triangular header geometries, International Journal of Refrigeration, v 76, p. 170-83, Apr. 2017.

* cited by examiner

PROCESS AND APPARATUS FOR FLUIDIZING A CATALYST BED

FIELD

The field is fluidized beds and particularly catalyst cooler fluidization for a catalytic regenerator such as in a fluid catalytic cracking (FCC) unit and MTO.

BACKGROUND

FCC technology has undergone continuous improvement and remains the predominant source of gasoline production in many refineries. This gasoline, as well as lighter products, is formed as the result of cracking heavier, higher molecular weight, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst. Coke must be burned off of the catalyst in a regenerator.

When a catalyst is exposed to oxygenates, such as methanol, to promote a reaction to olefins in a methanol to olefins process (MTO), carbonaceous material is generated and deposited on the catalyst. Accumulation of coke deposits interferes with the catalyst's ability to promote the MTO reaction. As the amount of coke deposit increases, the catalyst loses activity and less of the feedstock is converted to the desired olefin product. The step of regeneration removes the coke from the catalyst by combustion with oxygen, restoring the catalytic activity of the catalyst. The regenerated catalyst may then be exposed again to oxygenates to promote the conversion to olefins.

Conventional regenerators typically include a vessel having a spent catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel.

There are several types of catalyst regenerators in use today. The conventional bubbling bed regenerator typically has just one chamber in which air is bubbled through a dense catalyst bed. Spent catalyst is added and regenerated catalyst is withdrawn from the same dense catalyst bed. Relatively little catalyst is entrained in the combustion gas exiting the dense bed.

Two-stage bubbling beds and combustor regenerators have two chambers. In a two-stage bubbling bed regenerator, spent catalyst is added to a dense bed in a first, upper chamber stage and is partially regenerated with air. The partially regenerated catalyst is transported to a dense bed in a second, lower chamber stage and completely regenerated with air. The completely regenerated catalyst is withdrawn from the second chamber.

Complete catalyst regeneration can be performed in a dilute phase, fast-fluidized, combustion regenerator. Spent catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other.

Catalyst coolers have been used to cool regenerated catalyst and permit the regenerator and the reactor to operate under independent conditions. In catalyst coolers, hot regenerated catalyst is cooled by indirect heat exchange with water in nested cooler tubes which partially vaporizes to steam. The steam is removed from the catalyst cooler for other uses; whereas, the cooled catalyst is returned to the regenerator. Fluidization air is required in the catalyst cooler to keep the catalyst flowing and to promote the heat transfer.

Catalyst coolers are typically fluidized by fluidization lances suspended in the catalyst cooler from a fluidization manifold located in the top of the cooler. The long fluidization lances hang down to near the bottom of the nested cooler tubes. The fluidization manifold is supported on top of the nested cooler tubes. A supply nozzle to the fluidization manifold is attached to the shell of the cooler, so is anchored in place. The nested cooler tubes and the fluidization manifold grow upward relative to the supply nozzle due to thermal expansion. Therefore, the fluidization manifold has to be flexible enough to accommodate this thermal growth.

Shut downs of a regenerator are costly due to the fact that product is not being made during shut down. Hence, shut downs should be minimized to maximize profitability.

If catalyst cooler operation is interrupted, the catalyst bed in the cooler must be re-fluidized. Improved ways of designing and operating catalyst coolers are sought.

SUMMARY

We have discovered a process and apparatus for supplying fluidization gas to a catalyst cooler from below the catalyst bed. A fluidization header is located below the catalyst bed in an outlet manifold that collects and discharges vaporized water from the cooler tubes. The fluidization header suspended in the catalyst cooler can now be omitted. Additional features and advantages of the invention will be apparent from the description of the invention, figures and claims provided herein.

DEFINITIONS

Figures 1, 2, 3:
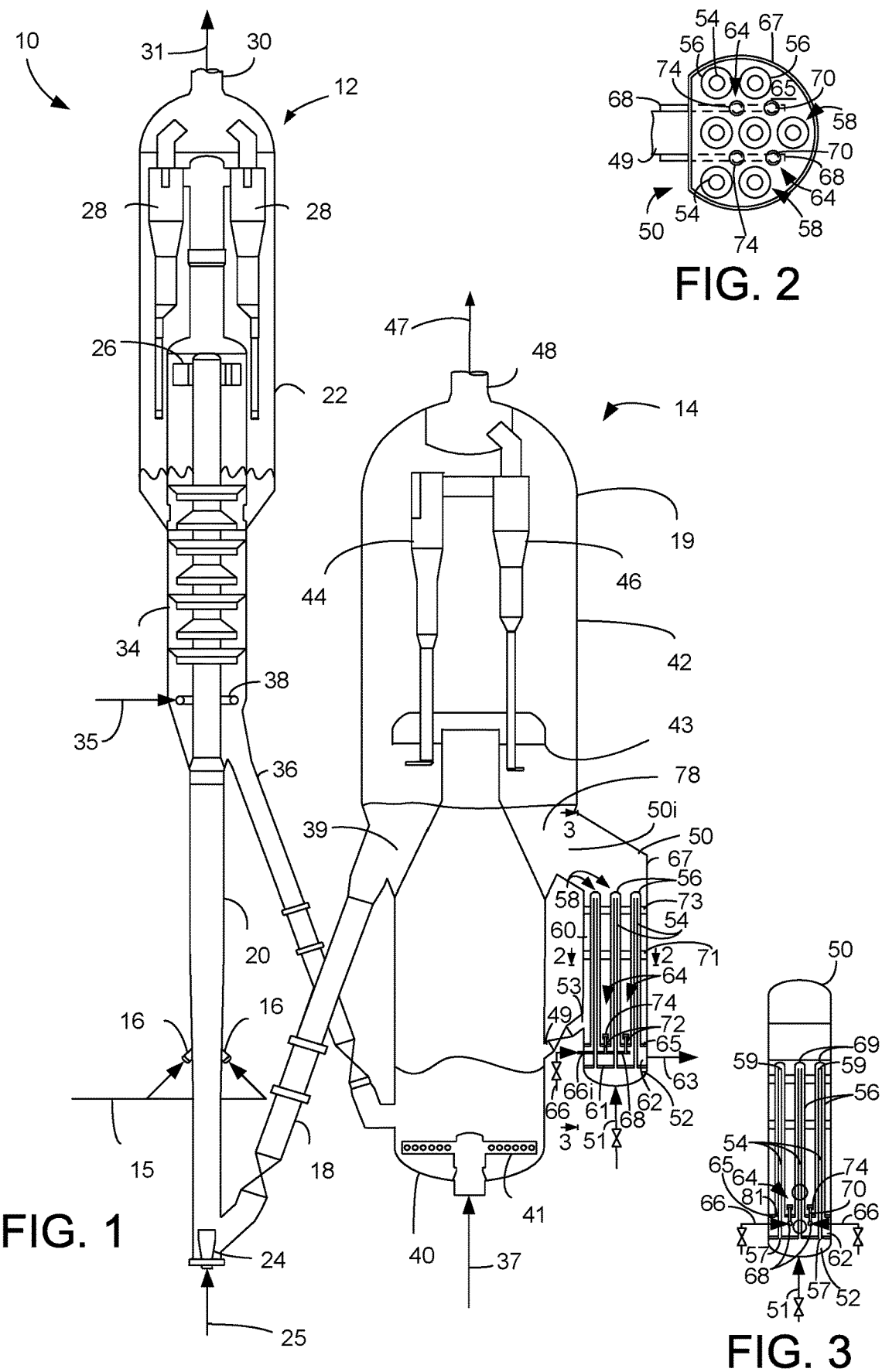
FIG. 1 is a schematic drawing of an FCC unit of the present invention.
FIG. 2 is an enlarged section taken at segment 2-2.
FIG. 3 is an elevation drawing taken at segment 3-3.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through any other intervening vessel.

The term "indirect communication" means that flow from the upstream component enters the downstream component after passing through an intervening vessel.

The term "bypass" means that the object is out of downstream communication with a bypassing subject at least to the extent of bypassing.

As used herein, the term "separator" means a vessel which has an inlet and at least two outlets.

As used herein, the term "predominant" or "predominate" means greater than 50 wt %, suitably greater than 75 wt % and preferably greater than 90 wt %.

As used herein, the term "a component-rich stream" means that the rich stream coming out of a vessel has a greater concentration of the component than the feed to the vessel.

DETAILED DESCRIPTION

We have found that supplying fluidization gas from below the catalyst bed from the outlet tube sheet enables elimination of the suspended fluidization manifold at the top of the cooler and the long hanging fluidization lances. The fluidization supply header is inside the outlet manifold of the cooler, so the fluidization gas will be at the same temperature as water vapor heated by the hot catalyst. The apparatus will have fewer weld connections, reducing the number of potential failure points. In the event of a leak in the header, that header can be turned off to minimize the impact on the cat cooler performance.

The embodiments herein are applicable to any fluidized bed of particulate material. One such application is a catalyst cooler for cooling catalyst from a FCC or a MTO regenerator. For simplicity, the process and apparatus will be described in the context of an FCC unit.

Now turning to the FIGS. wherein like numerals designate like components, the FIG. 1 illustrates a process and apparatus comprising an FCC unit 10. An FCC unit 10 includes a catalytic reactor 12 and a regenerator 14 fluidly connected to each other. Process variables typically include a cracking reaction temperature of 400° to 600° C. and a catalyst regeneration temperature of 500° to 900° C. Both the cracking and regeneration occur at an absolute atmospheric pressure below 5 atmospheres.

The FIGURE shows a typical FCC process unit, in which a heavy hydrocarbon feed or raw oil stream in a line 15 is distributed by distributors 16 into a riser 20 to be contacted with a newly regenerated cracking catalyst entering from a regenerator conduit 18. This contacting may occur in the narrow riser 20, extending upwardly to the bottom of a reactor vessel 22. The catalyst is fluidized and lifted to the heavy hydrocarbon feed stream by fluidizing gas from a fluidizing distributor 24 fed by fluidizing line 25. Heat from the catalyst vaporizes the heavy hydrocarbon feed, and the heavy hydrocarbon feed is thereafter catalytically cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a rough cut separator 26 and one or two stages of cyclones 28 in the reactor vessel 22. Product gases exit the reactor vessel 22 through a product outlet 30 into a product line 31 for transport to a product recovery section which is not shown. Inevitable side reactions occur in the riser 20 leaving coke deposits on the catalyst that lower catalyst activity. The spent catalyst requires regeneration for further use. Spent catalyst, after separation from the gaseous product hydrocarbon, falls into a stripping section 34 where steam from line 35 is fed to a stripping distributor 38 which strips any residual hydrocarbon vapor from the spent catalyst. After the stripping operation, the spent catalyst is fed to the catalyst regenerator 14 through a spent catalyst conduit 36.

The most common of such conventional heavy hydrocarbon feed streams is a VGO, which is typically a hydrocarbon material having a boiling range with an IBP of at least about 232° C. (450° F.), a T5 of about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Atmospheric residue is an alternative feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. Other heavy hydrocarbon feed stocks which may serve as a heavy hydrocarbon feed stream include heavy bottoms from crude oil, heavy bitumen crude oil, shale oil, tar sand extract, deasphalted residue, products from coal liquefaction, and vacuum reduced crudes. A suitable heavy hydrocarbon feed stream also includes mixtures of the above hydrocarbons and the foregoing list is not exhaustive.

The FCC catalyst can be a single catalyst or a mixture of different catalysts. Generally, the catalyst may include any of the well-known catalysts that are used in the art of FCC, such as an active amorphous clay-type catalyst and/or a high activity, crystalline molecular sieve. Zeolites may be used as molecular sieves in FCC processes. Typically, the zeolitic molecular sieves appropriate for FCC have a large average pore size. Usually, molecular sieves with a large pore size have pores with openings of greater than about 0.7 nm in effective diameter defined by greater than about 10, and typically about 12, member rings. Suitable large pore zeolite catalysts may include synthetic zeolites such as X and Y zeolites, mordenite and faujasite. The zeolite can have any suitable amount of a rare earth metal or rare earth metal atoms in oxide form. Suitably, the FCC catalyst includes a large pore zeolite, such as a Y-type zeolite, and a matrix material comprising an active alumina material, a binder material, including either silica or alumina, and an inert filler such as kaolin. The ratio of zeolite to matrix in the FCC catalyst stream should be no more than 2. Other suitable FCC catalysts include Amber from Albemarle Corporation located in Baton Rouge, La., Stamina from BASF Corporation from Iselin, N.J. or Midas from WR Grace and Co. from Columbia, Md. A small to medium pore zeolite such as comprising a MFI type of catalyst may also be part of the FCC catalyst.

FIG. 1 depicts a regenerator 14 comprising a regenerator vessel 19 known as a combustor. However, other types of regenerators are suitable such as one or two-stage bubbling beds. In the catalyst regenerator 14, a stream of oxygen-containing gas, such as air, is introduced from a main air line 37 from a main air blower, not shown, through a main air distributor 41 to contact the spent catalyst in a first, lower chamber 40, combust coke deposited thereon, and provide regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 42 through a disengager 43. Finer separation of the regenerated catalyst and flue gas exiting the disengager 43 is achieved using first and second stage separator cyclones 44, 46, respectively within the upper chamber 42 of the catalyst regenerator 14. Catalyst separated from flue gas dispenses through dip legs from cyclones 44, 46 into a catalyst bed while flue gas relatively lighter in catalyst sequentially exits cyclones 44, 46 and is discharged from the regenerator vessel 14 through a flue gas outlet 48 in a flue gas line 47.

Regenerated catalyst may be recycled back to the reactor 12 through the regenerator conduit 18. The riser 20 of the reactor 12 may be in downstream communication with the regenerator vessel 19 of the regenerator 14. The regenerator conduit has an inlet end connecting to the regenerator vessel 19, in an aspect the upper chamber 42 of the regenerator vessel 19, for receiving regenerated catalyst therefrom and an outlet end connecting to the riser 20 of the reactor 12 for transporting regenerated catalyst to the riser 20 of the reactor 12. As a result of the coke burning, the flue gas vapors exiting at the top of the catalyst regenerator 14 in the flue gas line 48 contain $SO_x$, $NO_x$, $CO$, $CO_2$, $N_2$, $O_2$ and $H_2O$, along with smaller amounts of other species. Additionally, some of these species may exit with regenerated catalyst exiting in a regenerator conduit 18 and enter the riser 20 of the reactor 12.

The regenerator 14 may include a catalyst cooler 50 in downstream communication with and fluid connection to the regenerator 14 and particularly the regenerator vessel 19. The catalyst cooler cools the hot catalyst from the regenerator to remove heat from the FCC unit 10. Catalyst is transported from the regenerator 14, particularly from the bed 39 in the upper chamber 42 of the regenerator vessel 19, into the catalyst cooler 50. In a combustor regenerator shown in the FIG. 1, regenerated catalyst may be transported from the upper chamber 42 into the lower chamber 40 of the regenerator vessel 19 through the catalyst cooler 50 and/or through recycle conduits that are not shown. Regenerated catalyst enters the catalyst cooler 50 through an inlet 50i. Regenerated catalyst may exit the catalyst cooler back through the inlet 50i in a back-mix catalyst cooler. In a flow-through catalyst cooler, cooled catalyst exits through an outlet 53 to a cool catalyst conduit 49 which introduces cooled, regenerated catalyst back into the lower chamber 40 through a control valve. Evidently, if the regenerator only has a single chamber, inlet 50i would be from and the outlet 53 would be to the same regenerator chamber.

The catalyst cooler 50 comprises a vessel with an outer wall 67 that includes at least one nested tube pair 58 comprising an inner tube 54 nested within at least an outer tube 56. In an aspect, the catalyst cooler 50 comprises a vessel that includes a plurality of nested tube pairs 58 comprising a plurality of inner tubes 54 nested within and surrounded by a respective outer tube 56 in a plurality of outer tubes. The nested tube pairs 58 may be vertically oriented. Only three nested tube pairs are shown in FIG. 1, but many more are contemplated. Liquid water or lower pressure steam from a water line 51 feeds a water manifold 52. The water manifold 52 is defined by a water tube sheet 61 that only communicates with the inner tube(s) 54.

FIG. 3 is an elevational view taken at 3-3 in FIG. 1. The following description will refer to FIGS. 1 and 3. The inner tubes 54 are in direct, downstream communication with the water manifold 52. Water is delivered to inlet ends 57 of the inner tubes 54. The inlet ends 57 are open and coincident with openings in the water tube sheet 61. Water flows up the inner tube(s) 54 into the interior of the catalyst cooler 50 containing a catalyst bed 60. Heat transfers across respective walls of the inner tubes 54 from heated water in the outer tubes 56. The water is discharged through open outlet ends 59 of the inner tubes 54 into the outer tubes 56. The outer tubes 56 are equipped with end walls 69 defining closed inlet ends that are opposed to and spaced from the open outlet ends 59 of the inner tubes 54. The water is discharged from the outlet ends 59 against the end walls 69 of the outer tubes 56 which receive water interiorly to the inlet ends. The water reverses its flow direction upon entering the outer tubes 56 and flows in an opposite direction. Heat transfers across walls of the outer tubes 56. The water in the outer tubes 56 indirectly absorbs heat from the hot, regenerated catalyst in the catalyst bed 60, thereby indirectly cooling the regenerated catalyst in the catalyst bed, while heating the water in the outer tubes 56. The transfer of heat to the water in the outer tube(s) 56 vaporizes it to steam.

The steam which may be mixed with liquid water travels down the outer tube(s) 56 annular to the respective inner tube(s) 54 in the nested tube pair 58 and exits from open outlet ends 81 of the outer tubes 56. The outlet ends 81 have openings that are coincident with openings in the outlet tube sheet 65. Vaporized water exits the outer tubes 56 and is withdrawn from the catalyst bed 60 from the outer tube(s) into the outlet manifold 62. The outlet manifold 62 is defined by the water tube sheet 61 and an outlet tube sheet 65. The outlet manifold is in direct, downstream communication with said outer tubes 56 and collects vaporized water from the outer tubes. The inner tubes 54 extend through the outlet manifold 62 but only communicate with the outlet manifold through the outlet tubes 56 which directly communicate with the outlet manifold through the outlet tube sheet 65. Steam and water from the outlet manifold 62 exits the catalyst cooler 50 in a steam line 63. An example of a catalyst cooler is provided in U.S. Pat. No. 5,027,893.

Baffle guides 71 and 73 extend across the catalyst cooler 50 to hold internals, nested tube pairs 58, in place laterally but allow them to freely expand and contract longitudinally due to thermal forces. The inner tubes 54 may be anchored at their inlet ends 57 at the water tube sheet 61 and the outer tubes 56 may be anchored at their outlet ends 81 at the outlet tube sheet 65 which are both at their lower ends.

The catalyst cooler 50 receives hot catalyst from the catalyst bed 39 in the regenerator 14 through inlet 50i which collects in the catalyst bed 60 in the catalyst cooler. Hot catalyst is cooled in the catalyst bed 60 by water circulating though the nested tube pairs 58. In a back mixed cooler, catalyst enters and exits the catalyst cooler 50 through the same inlet 50i. In a flow through catalyst cooler, cooled catalyst exists the catalyst cooler 50 through the outlet 53.

Fluidizing gas from fluidization line 66 is fed to the catalyst cooler 50 through an inlet 66i located below the bed 60 of catalyst to fluidize the bed of catalyst and facilitate heat transfer. The bed 60 of catalyst descends in the cooler 50 as low as the outlet tube sheet 65. The fluidization line 66 feeds fluidization gas, containing oxygen such as air, to a fluidization header 68 that supplies fluidization distributors 64. The header 68 may protrude laterally through a wall of the catalyst cooler 50 and feed a plurality of fluidization distributors 64. The fluidization distributors 64 may comprise vertical pipes 70 that are in downstream communication with the fluidization header 68 for distributing fluidization gas to the catalyst cooler 50. The pipes 70 may protrude from the header 68 through openings in the outlet tube sheet 65. The pipes 70 have open upper ends for emitting distribution gas above the open end into the catalyst bed 60 and cooler 50. The fluidization distributors 64 may also include a cap 74 fixed above the open end of the pipes 70 to prevent ingress of catalyst and facilitate distribution of the fluidization gas. The fluidization distributors 64 are also anchored at outlet tube sheet 65. Accordingly, the fluidization distributors 64 and the inner tubes 54 and the outer tubes 56 can all thermally grow in the same upward direction without opposing each other.

The fluidization header 68 may extend laterally in and through the outlet manifold 62 below the outlet tube sheet 65. The fluidization gas is fed through the header 68 in the outlet manifold 62 to the fluidization distributors 64. Location of the header 68 in the outlet manifold 62 enables the fluidization gas to be heated by indirect heat exchange with heated vaporized water in the outlet manifold 62 exiting the outer tubes 56.

The fluidization distributors 64 are disposed between the outer tubes 56 and distribute fluidization gas from the fluidization header 68 between the outer tubes 56.

FIG. 2 is a sectional view taken at 2-2 in FIG. 1 with obscured features shown in phantom. The fluidization header 68 extends between rows of inner tubes 54 in the outlet manifold, shown in phantom because they are below the outlet tube sheet 65. The fluidization distributors 64 comprising the pipes 70, shown in phantom because obscured by caps 74, extending into the catalyst cooler 50 above the outlet tube sheet 65. The fluidization distributors 64 extend in rows between rows of outer tubes 56 of the nested tube pairs 58 in the catalyst cooler 50 above the outlet tube sheet. More or less fluidization distributors 64 may be used. Four fluidization distributors 64 are shown in FIG. 2 located between seven nested tube pairs 58 comprising inner tubes 54 and outer tubes 56.

FIG. 3 shows that a single fluidization header 68 may be dedicated to a single row of fluidization distributors 64. A plurality of fluidization headers 68 each dedicated to a single row of fluidization distributors 64 may extend between rows of inner tubes 54. Accordingly, a single fluidization line 66 with a control valve thereon may feed a single fluidization header 68 and a single row of fluidization distributors 64. Hence, in case of malfunction, only the malfunctioning row of distributors need be taken off stream by closing the control valve on that malfunctioning fluidization header 68. The fluidization header 68 extends between rows of inner tubes 54 in the outlet manifold 62 below the outlet tube sheet 65. The fluidization distributors 64 comprising the pipes 70 covered by caps 74 extending into the catalyst cooler 50 above the outlet tube sheet 65. The fluidization distributors 64 extend in rows between rows of outer tubes 56 of the nested tube pairs 58 in the catalyst cooler 50 above the outlet tube sheet 65. The pipes 70 may be welded to the top and bottom of the outlet tube sheet 65 to fasten them in place.

By feeding the fluidization distributors 64 from below the catalyst bed 60, more stable operation and robust equipment may be achieved. The process and apparatus provides a low stress system at uniform temperature. Thermal growth of the longitudinally oriented inner tubes 54 and outer tubes in the nested tubes 58 and fluidization distributors 64 is in the same direction because they are all anchored at the same lower end minimizing stress that can occur when thermal growth of components is oppositional. The fluidization headers 68 and the fluidization distributors 64 are at the same temperature as the outlet manifold 62 and the outlet tube sheet 65, so there is minimal thermal stress in the fluidization distributors 64 and the fluidization headers 68.

SPECIFIC EMBODIMENTS

While the following is described in conjunction with specific embodiments, it will be understood that this description is intended to illustrate and not limit the scope of the preceding description and the appended claims.

A first embodiment of the invention is a process for fluidizing a bed of catalyst in a catalyst cooler comprising internals and the bed of catalyst passing water from a water manifold to an inner tube; heating water in the inner tube by indirect heat exchange with the bed of catalyst to vaporize at least some of the water; passing vaporized water to an outer tube nested around the inner tube; collecting the vaporized water in an outlet manifold; feeding fluidizing gas to the catalyst cooler through an inlet located below the bed of catalyst and distributing the fluidizing gas to the bed of catalyst to fluidize the bed of catalyst. An embodiment of the invention is one, any or all of prior embodiments in this paragraph up through the first embodiment in this paragraph further comprising a plurality of inner tubes and a plurality of outer tubes are respectively nested around a respective inner tube and water is passed from the water manifold to the plurality of inner tubes and vaporized water is passed from the outer tubes to the outlet manifold. An embodiment of the invention is one, any or all of prior embodiments in this paragraph up through the first embodiment in this paragraph further comprising feeding the fluidizing gas to the catalyst cooler through a header that supplies fluidization distributors. An embodiment of the invention is one, any or all of prior embodiments in this paragraph up through the first embodiment in this paragraph further comprising passing fluidizing gas from the header to the bed of catalyst between the outer tubes. An embodiment of the invention is one, any or all of prior embodiments in this paragraph up through the first embodiment in this paragraph further comprising feeding the fluidizing gas through the header in the outlet manifold. An embodiment of the invention is one, any or all of prior embodiments in this paragraph up through the first embodiment in this paragraph further comprising heating the fluidizing gas by indirect heat exchange with the vaporized water in the outlet manifold. An embodiment of the invention is one, any or all of prior embodiments in this paragraph up through the first embodiment in this paragraph further feeding water to the water manifold and vaporized water exits from the outlet manifold. An embodiment of the invention is one, any or all of prior embodiments in this paragraph up through the first embodiment in this paragraph further comprising combusting coke from spent catalyst in a regenerator to provide regenerated catalyst and flue gas; passing hot catalyst from the regenerator to the catalyst cooler to cool the hot catalyst; and passing cooled catalyst back to the regenerator.

A second embodiment of the invention is an apparatus for cooling catalyst comprising a vessel comprising a plurality of inner tubes each surrounded by an outer tube to comprise a plurality of outer tubes; a water manifold defined by a water tube sheet and in communication with the plurality of inner tubes; an outlet manifold defined by an outlet tube sheet and in communication with the plurality of outer tubes; and a header extending through the outlet manifold for delivering fluidizing gas to the catalyst cooler. An embodiment of the invention is one, any or all of prior embodiments in this paragraph up through the second embodiment in this paragraph further comprising pipes in communication with the header for distributing the fluidizing gas to the catalyst cooler. An embodiment of the invention is one, any or all of prior embodiments in this paragraph up through the second embodiment in this paragraph wherein the pipes protrude through the outlet tube sheet with an open end for emitting gas from the open end. An embodiment of the invention is one, any or all of prior embodiments in this paragraph up through the second embodiment in this paragraph further comprising a cap fixed above the open end. An embodiment of the invention is one, any or all of prior embodiments in this paragraph up through the second embodiment in this paragraph wherein the header protrudes through a wall of the catalyst cooler. An embodiment of the invention is one, any or all of prior embodiments in this paragraph up through the second embodiment in this paragraph wherein the header extends between rows of the inner tubes in the outlet manifold. An embodiment of the invention is one, any or all of prior embodiments in this paragraph up through the second embodiment in this paragraph wherein a single header communicates only with a single row of fluidization distributors. An embodiment of the invention is one, any or all of prior embodiments in this paragraph up through the second embodiment in this paragraph wherein the outlet manifold is defined by the water tube sheet. An embodiment of the invention is one, any or all of prior embodiments in this paragraph up through the second embodiment in this paragraph further comprising a catalyst regenerator connected to the catalyst cooler.

A third embodiment of the invention is an apparatus for cooling catalyst comprising a catalyst cooler comprising a plurality of inner tubes each surrounded by an outer tube to comprise a plurality of outer tubes; a water manifold defined by a water tube sheet and in communication with the plurality of inner tubes; an outlet manifold defined by an outlet tube sheet and the water tube sheet, the outlet manifold in communication with the plurality of outer tubes; and a header protruding through a wall of the catalyst cooler and extending through the outlet manifold for delivering fluidizing gas to pipes extending through the outlet tube sheet into the catalyst cooler. An embodiment of the invention is one, any or all of prior embodiments in this paragraph up through the third embodiment in this paragraph wherein the pipes have an open end for emitting gas from the open end. An embodiment of the invention is one, any or all of prior embodiments in this paragraph up through the third embodiment in this paragraph wherein the header extends between rows of the inner tubes in the outlet manifold.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for fluidizing a bed of catalyst in a catalyst cooler comprising internals and said bed of catalyst:
    passing water from a water manifold to an inner tube;
    heating water in said inner tube by indirect heat exchange with said bed of catalyst to vaporize at least some of the water;
    passing vaporized water to an outer tube nested around said inner tube;
    collecting said vaporized water in an outlet manifold;
    feeding fluidizing gas to said catalyst cooler through a header and a plurality of fluidization distributors in communication with said header extending through said outlet manifold and distributing said fluidizing gas to said bed of catalyst to fluidize said bed of catalyst.

2. The process of claim 1 further comprising a plurality of inner tubes and a plurality of outer tubes are respectively nested around a respective inner tube and water is passed from the water manifold to said plurality of inner tubes and vaporized water is passed from said outer tubes to said outlet manifold.

3. The process of claim 2 further comprising feeding said fluidizing gas to said catalyst cooler through said header that supplies fluidization distributors.

4. The process of claim 2 further comprising passing fluidizing gas from said header to said bed of catalyst between said outer tubes.

5. The process of claim 1 further comprising feeding said fluidizing gas through said header in said outlet manifold.

6. The process of claim 5 further comprising heating said fluidizing gas by indirect heat exchange with said vaporized water in said outlet manifold.

7. The process of claim 6 further feeding water to said water manifold and vaporized water exits from said outlet manifold.

8. The process of claim 1 further comprising: combusting coke from spent catalyst in a regenerator to provide regenerated catalyst and flue gas; passing hot catalyst from said regenerator to said catalyst cooler to cool said hot catalyst; and
    passing cooled catalyst back to said regenerator.

9. An apparatus for cooling catalyst comprising:
    a catalyst cooler comprising a plurality of inner tubes each surrounded by an outer tube to comprise a plurality of outer tubes;
    a water manifold defined by a water tube sheet and in communication with said plurality of inner tubes;
    an outlet manifold defined by an outlet tube sheet and in communication with said plurality of outer tubes; and
    a header and a plurality of fluidization distributors communicating with said header extending through said outlet manifold for delivering fluidizing gas to said catalyst cooler.

10. The apparatus of claim 9 further comprising pipes in communication with said header for distributing said fluidizing gas to said catalyst cooler.

11. The apparatus of claim 10 wherein said pipes protrude through said outlet tube sheet with an open end for emitting gas from said open end.

12. The apparatus of claim 11 further comprising a cap fixed above said open end.

13. The apparatus of claim 11 wherein said header protrudes through a wall of said catalyst cooler.

14. The apparatus of claim 11 wherein said header extends between rows of said inner tubes in said outlet manifold.

15. The apparatus of claim 14 wherein a single header communicates only with a single row of fluidization distributors.

16. The apparatus of claim 9 wherein said outlet manifold is defined by said water tube sheet.

17. The apparatus of claim 9 further comprising a catalyst regenerator connected to said catalyst cooler.

18. An apparatus for cooling catalyst comprising:
    a catalyst cooler comprising a plurality of inner tubes each surrounded by an outer tube to comprise a plurality of outer tubes;
    a water manifold defined by a water tube sheet and in communication with said plurality of inner tubes;
    an outlet manifold defined by an outlet tube sheet and said water tube sheet, said outlet manifold in communication with said plurality of outer tubes; and
    a header protruding through a wall of said catalyst cooler and extending through said outlet manifold for delivering fluidizing gas to pipes extending through said outlet tube sheet into said catalyst cooler.

19. The apparatus of claim 18 wherein said pipes have an open end for emitting gas from said open end.

20. The apparatus of claim 18 wherein said header extends between rows of said inner tubes in said outlet manifold.

* * * * *